(12) United States Patent
Iijima

(10) Patent No.: US 9,703,273 B2
(45) Date of Patent: Jul. 11, 2017

(54) SERVO CONTROL APPARATUS HAVING FUNCTION OF OPTIMIZING CONTROL GAIN ONLINE USING EVALUATION FUNCTION

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/186,546

(22) Filed: Jun. 20, 2016

(65) Prior Publication Data

US 2016/0378077 A1  Dec. 29, 2016

(30) Foreign Application Priority Data

Jun. 26, 2015 (JP) .................................. 2015-129297

(51) Int. Cl.
G05B 13/02 (2006.01)
(52) U.S. Cl.
CPC ................................ G05B 13/0265 (2013.01)
(58) Field of Classification Search
None
See application file for complete search history.

(56) References Cited

U.S. PATENT DOCUMENTS

| 4,079,301 | A | 3/1978 | Johnson, III et al. |
| 6,274,995 | B1 | 8/2001 | Kerner |
| 8,093,856 | B2 * | 1/2012 | Miyaji ................... G05B 19/19 112/117 |
| 8,786,219 | B2 * | 7/2014 | Ikeda ....................... H02P 5/52 242/334.1 |
| 2013/0169196 | A1 * | 7/2013 | Markham ................. H02P 6/08 318/3 |
| 2013/0320908 | A1 * | 12/2013 | Iwashita ............... G05B 11/011 318/632 |

FOREIGN PATENT DOCUMENTS

| JP | 2-261083 A | 10/1990 |
| JP | 9-131087 A | 5/1997 |
| JP | 2002-171778 A | 6/2002 |
| JP | 2010-250509 A | 11/2010 |
| JP | 2015-076024 A | 4/2015 |

* cited by examiner

*Primary Examiner* — Shawki S Ismail
*Assistant Examiner* — Muhammad S Islam
(74) *Attorney, Agent, or Firm* — Hauptman Ham, LLP

(57) ABSTRACT

A servo control apparatus includes a speed command generation unit, a torque command generation unit, a speed detection unit, a speed control loop, a speed control loop gain setting unit, a sinusoidal disturbance input unit which applies a sinusoidal sweep to the speed control loop, a frequency characteristic calculation unit which estimates the gain and phase of a speed control loop input/output signal from output of the speed control loop when a sine wave is input to the speed control loop, a reference characteristic generation unit which generates frequency characteristics for a feed axis, and a gain adjusting unit which adjusts the speed control loop gain. The gain adjusting unit uses the reference frequency characteristics and actually measured frequency characteristics to calculate an evaluation function value for each frequency sweep, and adjusts online the speed control loop gain to achieve a desired evaluation function value.

3 Claims, 5 Drawing Sheets

FIG. 3A
ADJUSTMENT OF SPEED CONTROL LOOP GAIN TO BE HIGHER →
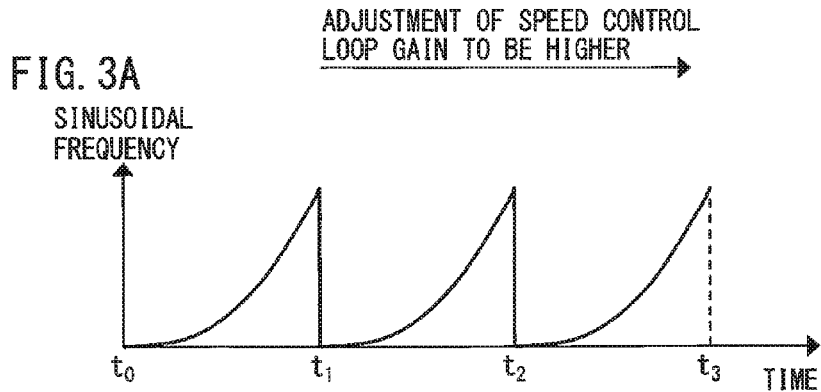
FIG. 3B
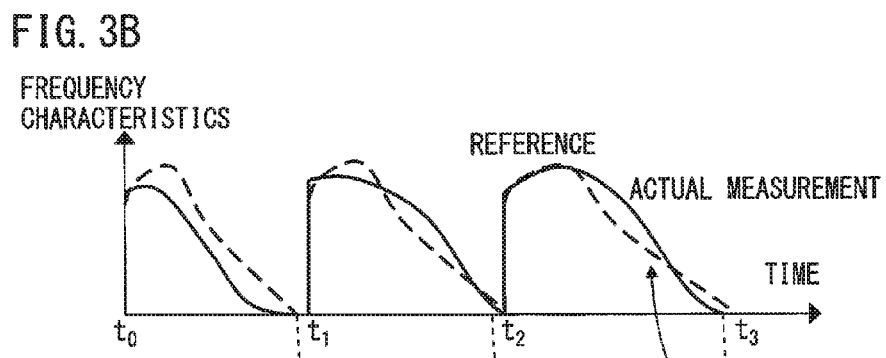
FIG. 3C
DIFFERENCE IN EVALUATION FUNCTION VALUE IS REFLECTED ON VALUE OF GAIN ADJUSTMENT

SERVO CONTROL APPARATUS HAVING FUNCTION OF OPTIMIZING CONTROL GAIN ONLINE USING EVALUATION FUNCTION

RELATED APPLICATIONS

The present application claims priority to Japanese Patent Application Number 2015-129297 filed Jun. 26, 2015, the disclosure of which is hereby incorporated by reference herein in its entirety.

BACKGROUND OF THE INVENTION

1. Field of the Invention

The present invention relates to a servo control apparatus, in particular, to a servo control apparatus having a function for optimizing the control gain online using an evaluation function.

2. Description of the Related Art

A variety of devices and methods for measuring the frequency characteristics of a servo control system for a servo control apparatus have been proposed and are widely used to measure transfer characteristics in feed axes of machine tools. In general, response vibration is measured when an object to be analyzed is forcibly vibrated by a vibration generator (frequency sweeping), and time-series data representing the measured vibration is logged in a mass memory. After that, various signal processing techniques are used to obtain a frequency transfer function. In simple measurement, response vibration generated using an actuator as a vibration source is measured and logged to process signals. A vibration circuit is used for an electrical circuit or an optical system.

As a system which optimizes the control gain, a method for fitting a time-series signal to define a basic mode function for a reference model and selecting the result of introducing adjusting parameters into the function as a reference model has been proposed (see, e.g., Japanese Laid-open Patent Publication No. 2015-076024). In this conventional technique, the weighted sum of a plurality of indices (overshoot and rise time) which can be obtained as time-series data and quantified is used as an evaluation function to adjust the PID parameters. Although the meaning of the evaluation function is not concerned, this function typically allows optimization of a compensator for plant control.

In addition, a method for calculating an evaluation value for control characteristics using the error between actually measured time-series data and time-series data of reference responses has been proposed (see, e.g., Japanese Laid-open Patent Publication No. H9-131087). In this conventional technique, an approximate model is stored in an adjusting device and adjusted, and the adjustment result is applied to an actual controlled object.

However, these conventional techniques are based on reference model fitting with the purpose of curve fitting to responses in the time domain. No method has previously been proposed to quantitatively evaluate the difference from a reference transfer function directly in the frequency domain, using frequency characteristics which are available online.

SUMMARY OF INVENTION

It is an object of the present invention to provide a servo control apparatus which can attain both stability and high-speed response in principle by handling control characteristics as a mathematically defined optimization problem.

A servo control apparatus according to an embodiment of the present invention is a control apparatus for a machine tool including a feed axis driven by a servomotor and includes a speed command generation unit, a torque command generation unit, a speed detection unit, a speed control loop, a speed control loop gain setting unit, a sinusoidal disturbance input unit, a frequency characteristic calculation unit, a reference characteristic generation unit, and a gain adjusting unit. The speed command generation unit generates a speed command value for the servomotor. The torque command generation unit generates a torque command value for the servomotor. The speed detection unit detects the speed of the servomotor. The speed control loop includes the speed command generation unit, the torque command generation unit, and the speed detection unit. The speed control loop gain setting unit sets a control gain for the speed control loop. The sinusoidal disturbance input unit applies a sinusoidal sweep to the speed control loop. The frequency characteristic calculation unit estimates the gain and phase of a speed control loop input/output signal from output of the speed control loop when a sine wave is input to the speed control loop. The reference characteristic generation unit generates reference frequency characteristics for the feed axis. The gain adjusting unit adjusts the speed control loop gain. The gain adjusting unit uses the reference frequency characteristics generated by the reference characteristic generation unit and actually measured frequency characteristics calculated by the frequency characteristic calculation unit to calculate an evaluation function value for each frequency sweep to the actually measured frequency characteristics, and adjusts online the speed control loop gain to achieve a desired evaluation function value.

BRIEF DESCRIPTION OF THE DRAWINGS

Objects, features, and advantages of the present invention will become more apparent from the following description of an embodiment when taken in conjunction with the accompanying drawings, in which:

FIG. 3A is a graph representing another temporal variation in sinusoidal frequency in the servo control apparatus according to the embodiment of the present invention;

FIG. 3B is a graph representing temporal variations in actual measurement value of the frequency characteristics and in reference frequency characteristic in the servo control apparatus according to the embodiment of the present invention;

FIG. 3C is a graph representing a temporal variation in evaluation function value in the servo control apparatus according to the embodiment of the present invention;

DETAILED DESCRIPTION

A servo control apparatus according to an embodiment of the present invention will be described below with reference to the accompanying drawings.

Figure 1:
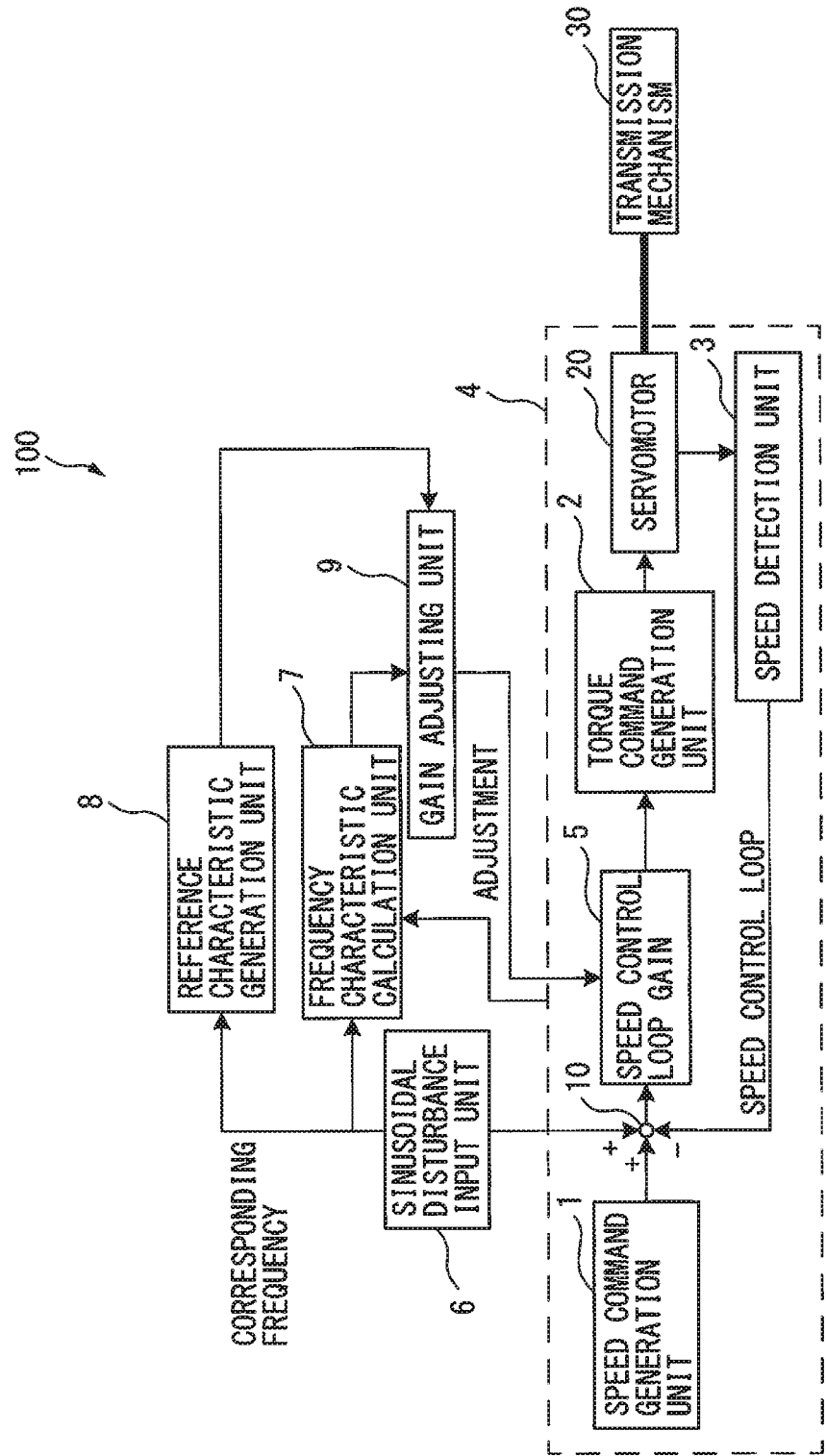
FIG. 1 is a block diagram illustrating the configuration of a servo control apparatus according to an embodiment of the present invention.

FIG. 1 is a block diagram illustrating the configuration of the servo control apparatus according to an embodiment of the present invention. The servo control apparatus 100 according to the embodiment of the present invention a control apparatus for a machine tool including a feed axis driven by a servomotor 20 and includes a speed command generation unit 1, a torque command generation unit 2, a speed detection unit 3, a speed control loop 4, a speed control loop gain setting unit 5, a sinusoidal disturbance input unit 6, a frequency characteristic calculation unit 7, a reference characteristic generation unit 8, and a gain adjusting unit 9. The speed command generation unit 1 generates a speed command value for the servomotor 20. The torque command generation unit 2 generates a torque command value for the servomotor 20. The speed detection unit 3 detects the speed of the servomotor 20. The speed control loop 4 includes the speed command generation unit 1, the torque command generation unit 2, and the speed detection unit 3. The speed control loop gain setting unit 5 sets a control gain for the speed control loop 4. The sinusoidal disturbance input unit 6 applies a sinusoidal sweep to the speed control loop 4. The frequency characteristic calculation unit 7 estimates the gain and phase of a speed control loop input/output signal from output of the speed control loop 4 when a sine wave is input to the speed control loop 4. The reference characteristic generation unit 8 generates reference frequency characteristics for the feed axis. The gain adjusting unit 9 adjusts the speed control loop gain. The gain adjusting unit 9 uses the reference frequency characteristics generated by the reference characteristic generation unit 8 and actually measured frequency characteristics calculated by the frequency characteristic calculation unit 7 to calculate an evaluation function value for each frequency sweep to the actually measured frequency characteristics, and adjusts online the speed control loop gain to achieve a desired evaluation function value.

The operation of the servo control apparatus according to the embodiment of the present invention will be described below. The speed command generation unit 1 generates a speed command value for driving the servomotor 20 and outputs it to an adder 10. The adder 10 adds sinusoidal disturbance input from the sinusoidal disturbance input unit 6 to the speed command value, subtracts the speed detection value of the servomotor 20 detected by the speed detection unit 3 from the speed command value, and outputs the calculated result to the speed control loop gain setting unit 5.

The speed control loop gain setting unit 5 sets a control gain for the speed control loop 4 adjusted by the gain adjusting unit 9.

The torque command generation unit 2 obtains the product of the calculated result obtained by the adder 10 multiplied by the speed control loop gain and outputs a torque command to drive the servomotor 20. The servomotor 20 activates a driven body (not illustrated) via a transmission mechanism 30.

The speed control loop 4 is configured to include the speed command generation unit 1, the torque command generation unit 2, and the speed detection unit 3.

The sinusoidal disturbance input unit 6 applies a sinusoidal sweep to the speed control loop 4. In other words, the sinusoidal disturbance input unit 6 inputs sinusoidal disturbance to the speed control loop 4.

The frequency characteristic calculation unit 7 estimates the gain and phase of a speed control loop input/output signal from output of the speed control loop 4 when sinusoidal disturbance is input to the speed control loop 4 of the servo control apparatus 100. The frequency characteristic calculation unit 7 represents the output of the speed control loop 4 using a Fourier series including an arbitrary number of terms, upon defining the disturbance input frequency from the sinusoidal disturbance input unit 6 as a fundamental frequency. The frequency characteristic calculation unit 7 calculates the amplitudes and phases of the fundamental wave components of the Fourier series to calculate frequency characteristics online.

The reference characteristic generation unit 8 generates reference frequency characteristics for the feed axis.

The gain adjusting unit 9 adjusts the speed control loop gain. The gain adjusting unit 9 preferably determines the value of adjustment of the speed control loop gain, based on the difference between the desired evaluation function value and an evaluation function value for actual sweeping.

The servo control apparatus 100 according to the embodiment of the present invention has a loop structure for speed control mounted in a servo servo control system. The speed control loop 4 directly reflects the mechanical characteristics of the transmission mechanism 30 connected to the servomotor 20.

As long as a method for calculating frequency characteristics is concerned, the structure of the speed control loop is of no importance. It suffices to construe a portion indicated by a dashed frame, illustrated as FIG. 1, as a system having one input/output relationship. Therefore, only the correspondence between the input and output signals of the speed control loop 4 may be taken into consideration. In frequency sweeping, frequency characteristics are obtained by checking a stationary response of the output signal as the sinusoidal frequency of the input signal is increased stepwise.

Figure 2A:
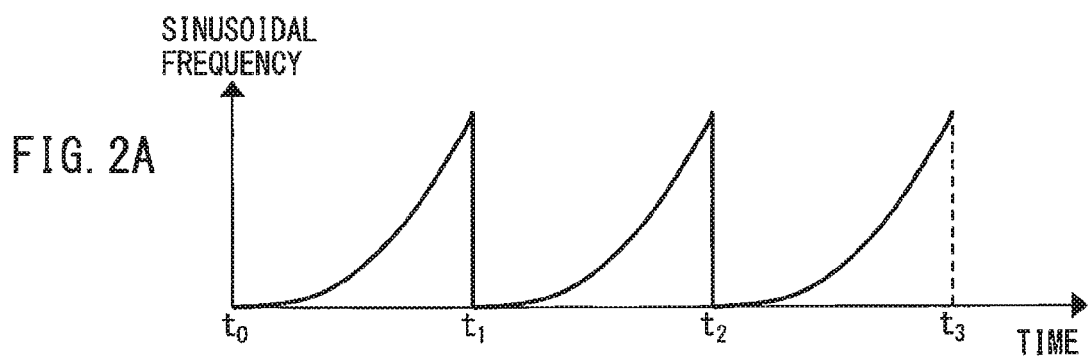
FIG. 2A is a graph representing a temporal variation in sinusoidal frequency in the servo control apparatus according to the embodiment of the present invention.

The operation of the servo control apparatus according to the embodiment of the present invention will be described below. FIG. 2A illustrates a temporal variation in frequency of a sine wave that is disturbance input applied from the sinusoidal disturbance input unit 6 to the speed control loop 4. Referring to FIG. 2A, the sinusoidal frequency is increased from time $t_0$ to time $t_1$ and reset to the initial value at time $t_1$. Similarly, the sinusoidal frequency is increased from time $t_1$ to time $t_2$ and reset to the initial value at time $t_2$. Subsequently, the sinusoidal frequency is varied in the same way. The period from time $t_0$ to time $t_1$ is defined as a first period, the period from time $t_1$ to time $t_2$ is defined as a second period, and the period from time $t_2$ to time $t_3$ is defined as a third period.

Figure 2B:
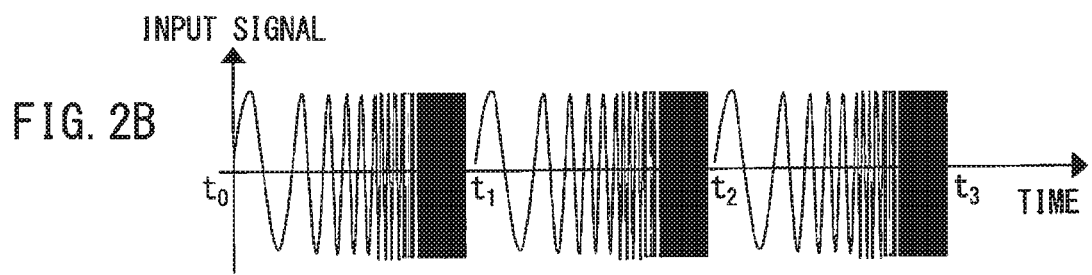
FIG. 2B is a graph representing a temporal variation in input signal in the servo control apparatus according to the embodiment of the present invention.
Figure 2C:
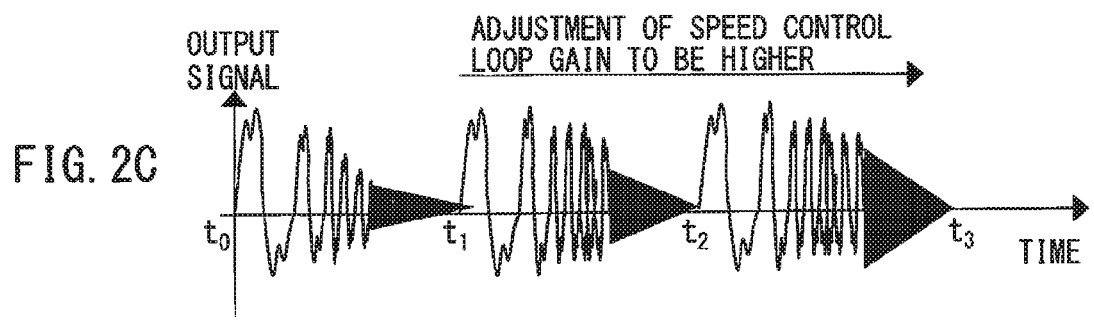
FIG. 2C is a graph representing a temporal variation in output signal in the servo control apparatus according to the embodiment of the present invention.
Figure 2D:
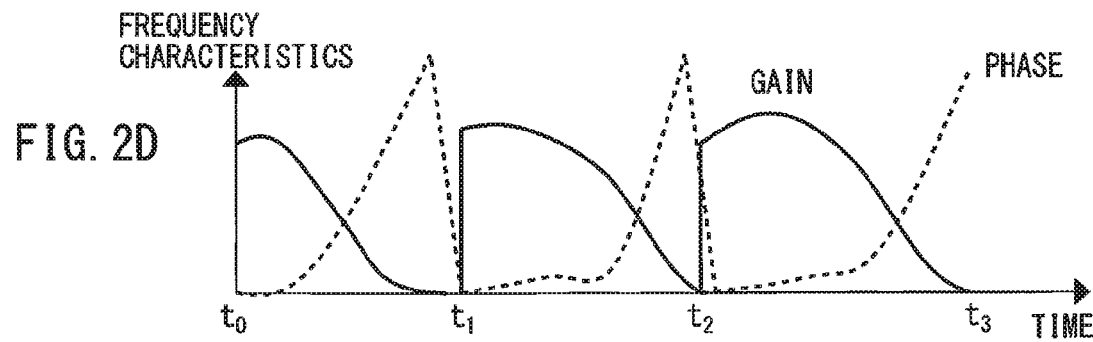
FIG. 2D is a graph representing temporal variations in frequency characteristic of the gain and phase in the servo control apparatus according to the embodiment of the present invention.

FIG. 2B illustrates a temporal variation in input signal of the speed control loop 4. FIG. 2C illustrates a temporal variation in output signal of the speed control loop 4. The frequency characteristic calculation unit 7 estimates the gain and phase of a speed control loop input/output signal from output of the speed control loop 4 when a sine wave is input to the speed control loop 4. FIG. 2D illustrates temporal variations in gain (solid line) and phase (dotted line) estimated by the frequency characteristic calculation unit 7. In this embodiment, since the gain adjusting unit 9 adjusts the speed control loop gain to be higher, the gain increases each time through the first, second, and third periods.

A method for sequentially measuring the frequency characteristics of the servo control system and optimizing the control parameters online using an evaluation function including reference and actually measured characteristics according to the present invention will be described below. FIG. 3A illustrates a temporal variation in frequency of a sine wave that is disturbance input applied from the sinusoidal disturbance input unit 6 to the speed control loop 4.

The frequency characteristic calculation unit 7 estimates frequency characteristics for the frequency of interest, i.e., the gain and phase of a speed control loop input/output signal from output of the speed control loop 4 when a sine wave is input to the speed control loop 4. The reference characteristic generation unit 8 calculates the frequency characteristics of the feed axis. FIG. 3B illustrates temporal variations in actual measurement value of the frequency characteristics (solid line) and in reference frequency characteristic (dotted line). When the sinusoidal frequency of the input signal reaches a maximum value, the gain adjusting unit 9 calculates an evaluation function value for sweeping.

The gain adjusting unit 9 uses the reference frequency characteristics generated by the reference characteristic generation unit 8 and actually measured frequency characteristics calculated by the frequency characteristic calculation unit 7 to calculate an evaluation function value for each frequency sweep to the actually measured frequency characteristics. An evaluation function $S_j$ is given by:

$$S_j = \int_{\omega_{min}}^{\omega_{max}} W(\omega)[|G_{model}(\omega)| - |G_{experimental}(\omega; kv)|] d\omega \quad (1)$$

where
ω is the frequency;
kv is the speed control loop gain;
$W(\omega)$ is the weight applied to frequency characteristics;
$G_{model}(\omega)$ is the characteristics; and
$G_{experimental}(\omega)$ is the actually measured characteristics.

Equation (1) is based on the weighted least-squares method. A speed control loop gain kv which minimizes $S_j$ is calculated by sequential sweeping. This makes it possible to obtain an optimum speed control loop gain kv.

The above-mentioned equation (1) is merely an exemplary equation for an evaluation function value and other evaluation functions may also be used. For example, an evaluation function (2) given as follows may be used.

$$S_j = \frac{\int_{\omega_{min}}^{\omega_{max}} [|G_{model}(\omega)| - |G_{experimental}(\omega; kv)|] d\omega}{\int_{\omega_{min}}^{\omega_{max}} |G_{model}(\omega)| d\omega} \quad (2)$$

Assume that the evaluation function $S_j$ is used in accordance with equation (2). Then, as $S_j$ comes closer to zero, the speed control loop gain kv comes closer to a target value. When $S_j$ is negative, the gain is excessive.

FIG. 3C illustrates a temporal variation in evaluation function value. An evaluation function value for the first period (time: $t_0$ to $t_1$) is calculated at time $t_1$. At time $t_1$, the evaluation function value in question is compared with the evaluation function value obtained one period before the former, and their difference is reflected on the value of gain adjustment. Evaluation function values are similarly calculated for the second and third periods and such calculation is iterated until the evaluation function value reaches a target value. In this way, the gain adjusting unit 9 adjusts online the speed control loop gain to achieve a desired evaluation function value. The gain adjusting unit 9 preferably determines the value of adjustment of the speed control loop gain, based on the difference between the desired evaluation function value and an evaluation function value for actual sweeping. FIG. 3C illustrates an example in which the evaluation function value reaches a target value at time $t_3$.

Figure 4A:
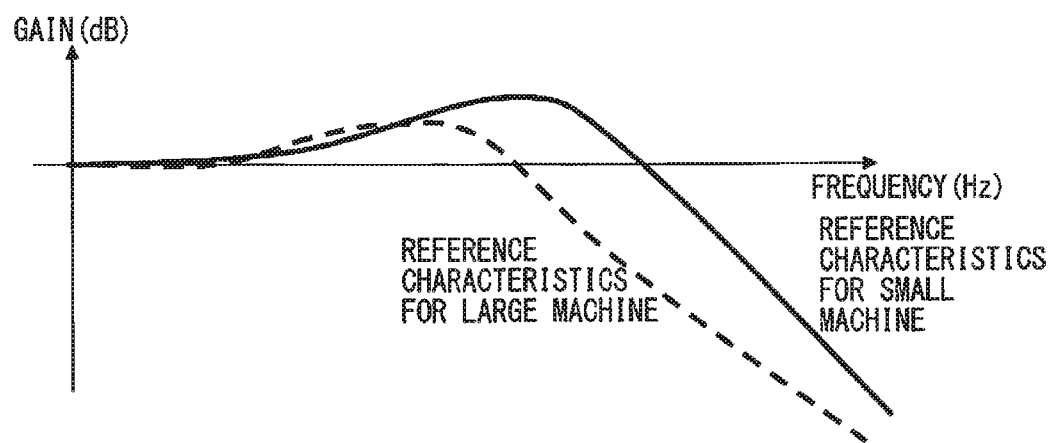
FIG. 4A is a graph representing the frequency characteristics of the gain when reference characteristics for a large machine and reference characteristics for a small machine are used in the servo control apparatus according to the embodiment of the present invention.
Figure 4B:
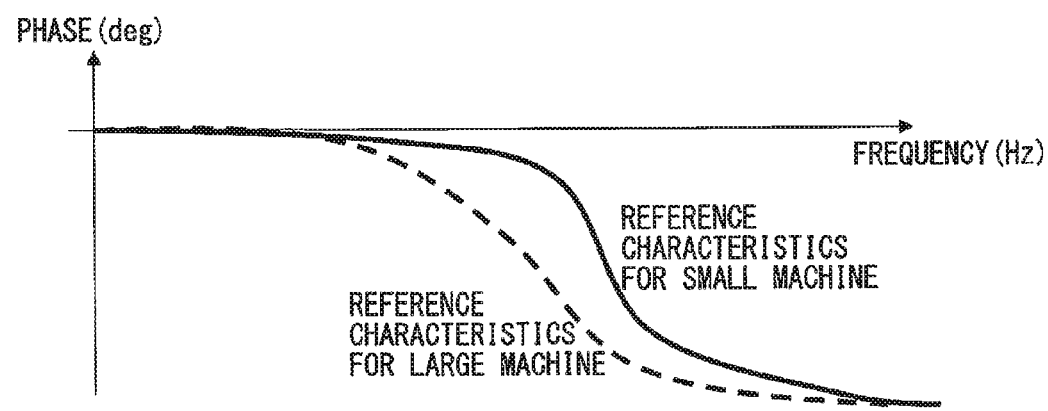
FIG. 4B is a graph representing the frequency characteristics of the phase when a reference characteristics for a large machine and a reference characteristics for a small machine are used in the servo control apparatus according to the embodiment of the present invention.

The reference characteristic generation unit 8 preferably generates characteristics which are variable in accordance with the configuration of the feed axis. The reference characteristics are variable in accordance with, e.g., whether the machine to be controlled is a large or small machine. FIG. 4A illustrates the frequency characteristics of the gain based on reference characteristics for a large machine and the frequency characteristics of the gain based on reference characteristics for a small machine. FIG. 4B illustrates the frequency characteristics of the phase based on reference characteristics for a large machine and the frequency characteristics of the phase based on reference characteristics for a small machine. To precisely estimate the evaluation function value, reference characteristics (ideal characteristics) may be preferably assumed in consideration of the magnitude of the resonant frequency. The ideal characteristics are defined herein as characteristics exhibiting a narrow control band for a large machine and characteristics exhibiting a wide control band for a small machine. As for a small machine, since the resonant frequency is comparatively high as nominal characteristics, the band can relatively easily be set wide (the gain may be set high). As for a large machine, since the resonance frequency is comparatively low, the band can hardly be set wide (the gain may not be set satisfactorily high). In this manner, changing the reference characteristics based on whether the machine to be controlled is a large or small machine makes it possible to more accurately calculate an evaluation function value, including a criterion for a higher gain, in view of the difference in resonance characteristic as mentioned above.

As described above, the servo control apparatus according to the embodiment of the present invention functions as a sequencer capable of vibration input, to measure frequency characteristics online. Upon each repetition of the measurement, evaluation function calculation is executed to sequentially adjust the parameters of the controller to bring the calculation result close to the characteristics. Thus, the control apparatus can obtain parameters which achieve optimum control characteristics online.

Figure 5:
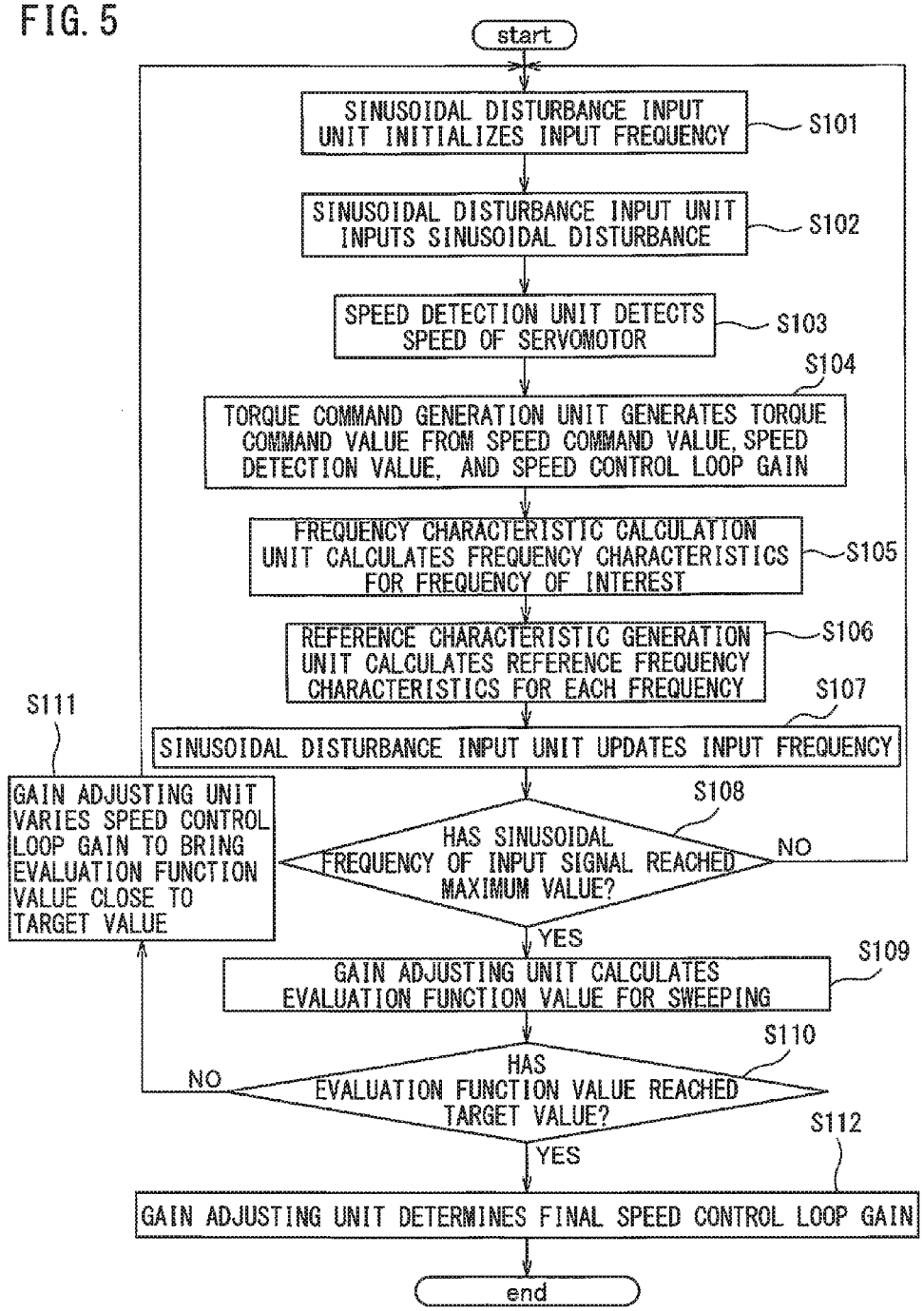
FIG. 5 is a flowchart for explaining the operation procedure of the servo control apparatus according to the embodiment of the present invention.

The operation procedure of the servo control apparatus according to the embodiment of the present invention will be described below with reference to a flowchart illustrated as FIG. 5. In step S101, the sinusoidal disturbance input unit 6 (see FIG. 1) initializes the input frequency. In step S102, the sinusoidal disturbance input unit 6 inputs sinusoidal disturbance to the speed control loop 4. In step S103, the speed detection unit 3 detects the speed of the servomotor 20.

In step S104, the torque command generation unit 2 generates a torque command value from a speed command value, a speed detection value, and a speed control loop gain. In step S105, the frequency characteristic calculation unit 7 calculates frequency characteristics for the frequency of interest. In step S106, the reference characteristic generation unit 8 calculates frequency characteristics for each frequency. In step S107, the sinusoidal disturbance input unit 6 updates the input frequency.

It is determined in step S108 whether the sinusoidal frequency of the input signal has reached a maximum value. When the sinusoidal frequency of the input signal has not reached a maximum value, steps S101 to S108 are repeated. When the sinusoidal frequency of the input signal has reached a maximum value, the gain adjusting unit 9 calculates an evaluation function value for sweeping in step S109. An evaluation function value is calculated using the above-described method.

It is determined in step S110 whether the evaluation function value has reached a target value. When the evaluation function value has not reached a target value, the gain adjusting unit 9 varies the speed control loop gain to bring the evaluation function value close to the target value in step S111, and steps S101 to S110 are repeated.

When the evaluation function value has reached a target value, the gain adjusting unit 9 determines a final speed control loop gain in step S112. In the aforementioned way, the difference from a reference transfer function can be quantitatively evaluated directly in the frequency domain, using frequency characteristics which are available online.

As described above, the servo control apparatus according to the embodiment of the present invention can sequentially measure the frequency characteristics of a servo control system and optimize the control parameters online using an evaluation function including and actually measured characteristics.

The servo control apparatus according to the embodiment of the present invention can attain both stability and high-speed response in principle.

The invention claimed is:

1. A servo control apparatus for a machine tool including a feed axis driven by a servomotor comprises:

a speed command generation unit configured to generate a speed command value for the servomotor;

a torque command generation unit configured to generate a torque command value for the servomotor;

a speed detection unit configured to detect a speed of the servomotor;

a speed control loop comprising the speed command generation unit, the torque command generation unit, and the speed detection unit;

a speed control loop gain setting unit configured to set a control gain for the speed control loop;

a sinusoidal disturbance input unit configured to apply a sinusoidal sweep to the speed control loop;

a frequency characteristic calculation unit configured to estimate a gain and a phase of a speed control loop input/output signal from output of the speed control loop when a sine wave is input to the speed control loop;

a reference characteristic generation unit configured to generate a frequency characteristic for the feed axis; and a gain adjusting unit configured to adjust the speed control loop gain, wherein the gain adjusting unit uses the frequency characteristic generated by the reference characteristic generation unit and an actually measured frequency characteristic calculated by the frequency characteristic calculation unit to calculate an evaluation function value for each frequency sweep to the actually measured frequency characteristic, and adjusts online the speed control loop gain to achieve a desired evaluation function value.

2. The servo control apparatus according to claim 1, wherein the reference characteristic generation unit generates a reference characteristic which is variable in accordance with a configuration of the feed axis.

3. The servo control apparatus according to claim 1, wherein the gain adjusting unit determines a value of adjustment of the speed control loop gain, based on a difference between the desired evaluation function value and an evaluation function value for actual sweeping.

* * * * *